L. S. BRANSON.
GUARD FOR WIRE FENCES.
APPLICATION FILED MAY 24, 1912.
1,051,674.
Patented Jan. 28, 1913.
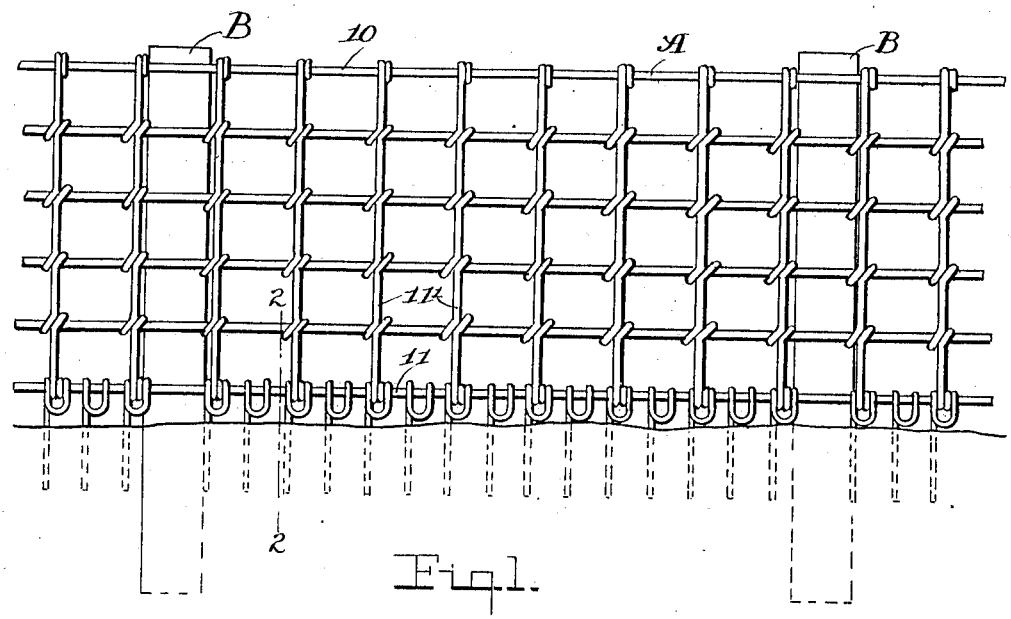
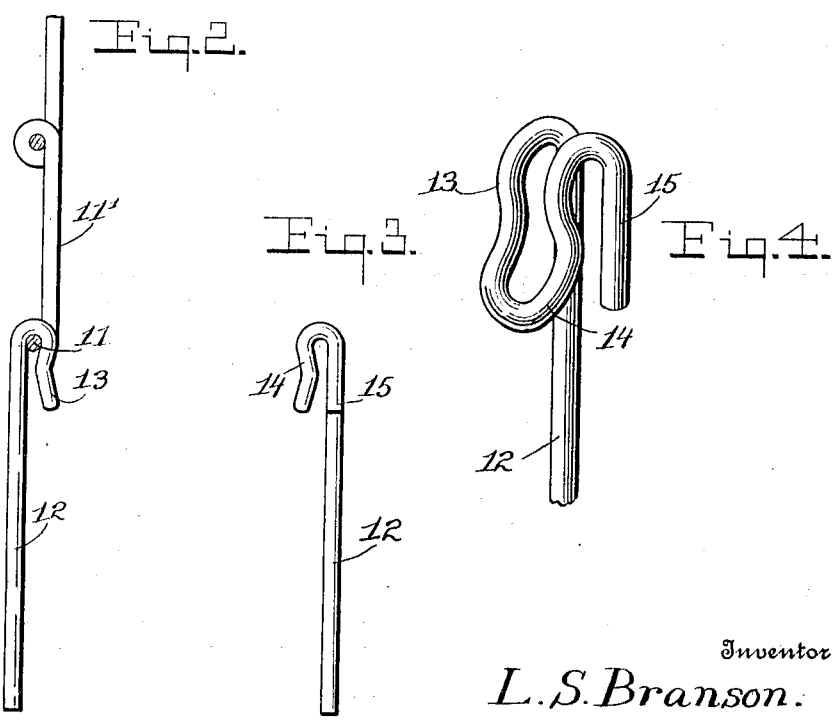
Inventor
L. S. Branson.
Witnesses
R. N. Jones.
Henry T. Bright
By Chandler & Chandler
Attorneys

UNITED STATES PATENT OFFICE.

LEE S. BRANSON, OF RICEBORO, GEORGIA.

GUARD FOR WIRE FENCES.

1,051,674.   Specification of Letters Patent.   Patented Jan. 28, 1913.

Application filed May 24, 1912. Serial No. 699,510.

*To all whom it may concern:*

Be it known that I, LEE S. BRANSON, a citizen of the United States, residing at Riceboro, in the county of Liberty, State of Georgia, have invented certain new and useful Improvements in Guards for Wire Fences; and I do hereby declare the following to be a full, clear, and exact description of the invention, such as will enable others skilled in the art to which it appertains to make and use the same.

This invention relates to guards for wire fences.

The object of the invention resides in the provision of a guard adapted to be anchored in the ground and to be engaged with the lower portion of the fence so as to effectually prevent stock from working beneath the fence and escaping.

A further object of the invention resides in the provision of a guard of the character referred to which will be simple in construction and which may be easily associated with the various types of wire fences and when so associated will efficiently serve the purpose for which it is intended.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a view in elevation of a section of a wire fence showing the guard applied, Fig. 2, a section on the line 2—2 of Fig. 1, on an enlarged scale, Fig. 3, a side elevation of the guard, and Fig. 4, a detail perspective view of the fence engaging end of the guard.

Referring to the drawings A indicates a wire fence which is supported in position by the usual ground post B. The fence A includes top and bottom wires 10 and 11 respectively and vertical wires 11' connecting the top and bottom wires. The bottom wire 11 and the vertical wires 11' are adapted to be engaged by respective guards when the latter are associated with the fence.

The guard is shown as formed from a single strand of wire which includes a relatively extensive shank portion 12. One end of this shank portion is bent inwardly as at 13 and this portion 13 is substantially V-shaped with its apex directed toward the shank 12 for a purpose that will presently appear. The free end of the portion 13 is then bent laterally and longitudinally of the shank 12 as at 14 and this portion 14 is V-shaped correspondingly to the portion 13, said portions 13 and 14 being disposed in a plane at right angles to the plane in which the portion 13 and shank 12 are disposed. The free end of the portion 13 is then bent inwardly parallel to the shank 12 as at 15, said portions 14 and 15 being disposed in a plane parallel to the plane in which the portion 13 and the shank 12 are disposed.

In applying the guard the shank 12 is disposed slightly inclined to the plane of the fence so as to dispose the portions 13 and 14 in position to engage over the bottom wire 11 when said guard is forced a sufficient distance into the ground. The guard in its application is also positioned with the shank 12 and portion 14 nearest the vertical wire 11' and on opposite sides of the latter so that when said guard is moved to engaging relation to the bottom wire of the fence the vertical wire 11' can pass between the shank 12 and portion 15 so as not to interfere with the application of the guard. It will be further noted that owing to the V-shape of the portions 13 and 14 the mouth of the guard is contracted centrally so that when the bottom wire 11 is forced inwardly of this contracted central portion of the mouth of the guard said wire is locked in engagement with the guard by reason of the resiliency of the portions 13 and 14. Any number of guards may be associated with the fence in this manner, the number being dependent upon the distance to be left between the guards to accomplish the ends desired.

What is claimed is:

A guard for wire fences comprising a shank having one end bent to form parallel V-shaped portions having corresponding arms mutually connected, one of said V-shaped portions being disposed laterally of the shank and said mutually connected arms being V-shape with their apexes directed toward the shank and constituting a hook bill adapted to be engaged over the lower wire of a fence when the shank has been forced a predetermined distance into the ground.

In testimony whereof, I affix my signature, in presence of two witnesses.

LEE S. BRANSON.

Witnesses:
 J. A. BRANSON,
 J. A. HOPE.

Copies of this patent may be obtained for five cents each, by addressing the "Commissioner of Patents, Washington, D. C."